US012592469B2

(12) United States Patent
Weinzierle et al.

(10) Patent No.: US 12,592,469 B2
(45) Date of Patent: Mar. 31, 2026

(54) DIELECTRIC WAVEGUIDE FOR PROPAGATING HIGH-FREQUENCY WAVES

(71) Applicant: VEGA Grieshaber KG, Wolfach (DE)

(72) Inventors: Christian Weinzierle, Wolfach (DE); Steffen Waelde, Niedereschach (DE)

(73) Assignee: VEGA Grieshaber KG, Wolfach (DE)

( * ) Notice: Subject to any disclaimer, the term of this patent is extended or adjusted under 35 U.S.C. 154(b) by 146 days.

(21) Appl. No.: 18/337,972

(22) Filed: Jun. 20, 2023

(65) Prior Publication Data

US 2023/0411816 A1 Dec. 21, 2023
US 2025/0174868 A9 May 29, 2025

(30) Foreign Application Priority Data

Jun. 20, 2022 (EP) .................................... 22179967

(51) Int. Cl.
*H01P 3/16* (2006.01)
*H01P 5/08* (2006.01)
*H01P 11/00* (2006.01)

(52) U.S. Cl.
CPC ................ *H01P 3/16* (2013.01); *H01P 5/087* (2013.01); *H01P 11/006* (2013.01)

(58) Field of Classification Search
CPC ........... H01P 3/16; H01P 5/087; H01P 11/006
USPC .......................................................... 333/239
See application file for complete search history.

(56) References Cited

U.S. PATENT DOCUMENTS

| | | | |
|---|---|---|---|
| 3,845,426 A | 10/1974 | Barlow |
| 11,557,841 B2 | 1/2023 | Kienzle et al. |
| 2022/0049984 A1 | 2/2022 | Winfried et al. |

FOREIGN PATENT DOCUMENTS

| | | |
|---|---|---|
| DE | 10 2020 129 765 A1 | 5/2022 |
| EP | 3 686 567 A1 | 7/2020 |
| JP | 48-14595 B1 | 5/1973 |
| JP | S4814345 B1 | 5/1973 |
| WO | WO 2012/079942 A2 | 6/2012 |
| WO | WO 2020/120059 A1 | 6/2020 |
| WO | WO 2022/107499 A1 | 5/2022 |

OTHER PUBLICATIONS

WO2022107499 English Translation (Year: 2022).*
Extended European Search Report issued Nov. 21, 2022 in European Patent Application No. 22179967.9, 14 pages.

(Continued)

*Primary Examiner* — Andrea Lindgren Baltzell
*Assistant Examiner* — Abigail Amir Yaldo
(74) *Attorney, Agent, or Firm* — Oblon, McClelland, Maier & Neustadt, L.L.P.

(57) ABSTRACT

A dielectric waveguide for propagating high-frequency waves is provided, the dielectric waveguide including a first section having a substantially uniform cross-section; and a second section having a larger cross-section than the first section. A method of manufacturing a dielectric waveguide is also provided. A dielectric waveguide assembly is also provided. A radar device is also provided, including the dielectric waveguide or a dielectric waveguide arrangement including the dielectric waveguide and a holder that at least partially surrounds the dielectric waveguide.

16 Claims, 7 Drawing Sheets

(56) References Cited

OTHER PUBLICATIONS

Baer et al., "Dielectric Waveguides for Industrial Radar Applications", International Journal of Microwave and Wireless Technologies, Feb. 24, 2015, pp. 1-15 (total 16 pages), XP 055602548.
European Office Action issued Jun. 3, 2025 in corresponding European Patent Application No. 22179967.9, 7 pages.

* cited by examiner

DIELECTRIC WAVEGUIDE FOR PROPAGATING HIGH-FREQUENCY WAVES

CROSS-REFERENCE TO RELATED APPLICATIONS

This application claims the benefit of priority under 35 U.S.C. § 119 from European Patent Application No. 22 179 967.9, filed on 20 Jun. 2022, the entire content of which is incorporated herein by reference.

TECHNICAL FIELD

The invention relates to a waveguide, in particular a dielectric waveguide, configured to propagate high-frequency waves, e.g., radar waves, a waveguide arrangement, a manufacturing method and a use.

BACKGROUND

Waveguides are suitable and/or configured to transmit radio frequency (RF) waves, e.g., from an RF generator to an antenna. For at least some waveguides—e.g., above a certain length of the waveguide—it may be necessary to arrange one or more supports or holders and/or other supporting means on the waveguide, e.g., to support the waveguide. However, for at least some waveguides, e.g., some types of dielectric waveguides, these supports may cause RF waves to leak out of the waveguide and/or cause spurious reflections in the RF-signal.

SUMMARY

There may be a desire to provide a device which can help to reduce interfering reflections in the RF-signal. This desire is met by the subject-matter of the independent patent claims. Further embodiments of the present disclosure result from the subclaims and the following description.

One aspect relates to a dielectric waveguide for propagating radio frequency waves, the waveguide comprising:

- a first portion having a substantially uniform cross-section, and
- a second section having a larger cross-section than the first section.

The dielectric waveguide may be implemented as a plastic filament, having a cross-sectional area of in principle any shape, which in at least some embodiments may be rectangular or circular. The dielectric waveguide may be suitable or adapted to transmit a high-frequency signal, in particular to transmit a high-frequency signal with low loss. For example, a dielectric waveguide may have a cross-sectional area between 0.25 $mm^2$ and 8 $mm^2$. The cross-sectional area may depend on the frequency of the waveguide to be transmitted. In general, a dielectric waveguide with a relatively small cross-sectional area—which may correspond to the first section—may have relatively lower signal attenuation than a waveguide with a relatively larger cross-sectional area. However, a waveguide with a larger cross-sectional area—which may correspond to the second section—may be less sensitive to external influences and objects (such as fixtures) located in close proximity to the waveguide.

Therefore, the dielectric waveguide described herein may be designed as a first section with a substantially uniform cross-section over a major part of its length, and as a second section or flare over at least some parts of its length, the second section having a larger cross-section than the first section. The second section or flare may be particularly suitable for having fastening elements (such as brackets) arranged thereon, for example. Advantageously, this allows a compromise to be achieved between low signal attenuation, which characterizes the first section or sections in particular, and low susceptibility to interference, which is typical of the second section. Furthermore, interference from the waveguide mounts may thereby be minimized and the radar system may be improved with respect to its ringing behavior (interfering reflections in the antenna range and/or close range of the antenna). Furthermore, the measurement reliability in the close range may be increased.

The manufacture of such dielectric waveguides with expansion may be realized by means of various manufacturing processes. For example, production by means of injection molding, in particular plastic injection molding, has proven to be very efficient and/or cost-effective.

In some embodiments, the cross-sectional area of the second section is larger than the cross-sectional area of the first section by a factor of 5 to 80 (between 5 and 80), in particular by a factor of 10 to 50, for example by a factor of 15 to 30. These ranges have proven to be a particularly efficient compromise between low signal attenuation and low interference when arranged with, e.g., mounts.

In some embodiments, a transition between the first section and the second section is stepped, sloped, and/or rounded. The transition at the left and right sides of the second section may have the same design. The design of the transition may depend on the selected manufacturing process.

In some embodiments, the dielectric waveguide has a cross-sectional area between 0.25 $mm^2$ and 8 $mm^2$, in particular between 0.3 $mm^2$ and 3 $mm^2$. The diameter of the cross-section may depend, for example, on the frequency and/or on the shape of the cross section (e.g., rectangular) as well as on the plastic used.

In some embodiments, the dielectric waveguide has a plurality of second sections, and the second sections have a spacing of between 10 mm and 300 mm. The spacing between the expansions of the dielectric waveguide may be equidistant from each other, but non-uniform spacing is also possible. The distances between the expansions may be substantially larger than the length of the expansions. Advantageously, this may emphasize the low signal attenuation.

In some embodiments, the cross-section of the first section and/or the second section is elliptical, in particular round, rectangular, in particular square, and/or polygonal, in particular as an equilateral polygon. The design of the cross-section may depend on the selected measuring frequency, the plastic used, the selected manufacturing process, and/or the objects (e.g., fasteners or holders) arranged thereon.

In some embodiments, the dielectric waveguide has a DK value (relative permittivity $\varepsilon_r$) between 2 and 5 and/or loss factors tan(0) between 0.00001 and 0.1.

In some embodiments, the dielectric waveguide is made of or comprises a plastic, particularly a material selected from a group including polyetheretherketone (PEEK), polytetrafluoroethylene (PTFE), perfluoroalkoxy (PFA), polyvinylidene fluoride (PVDF), and/or rigid polyethylene (e.g., high density polyethylene (HDPE)). In particular, the aforementioned plastics may tolerate high process temperatures and/or and be resistant to a variety of chemicals. In addition, from a high-frequency standpoint, these plastics may have small DK values ($2 \leq \varepsilon_r \leq 3.5$) and loss factors ($0.00001 \leq \tan(\delta) \leq 0.1$).

An aspect relates to a method of manufacturing a dielectric waveguide as described above and/or below by injection molding, in particular by plastic injection molding. This has proven to be very efficient and/or cost-effective.

An aspect relates to a dielectric waveguide assembly comprising a dielectric waveguide as described above and/or below, and a holder at least partially comprising the dielectric waveguide and/or otherwise disposed on the waveguide. Alternatively, a combination of another array of dielectric waveguides and waveguides is possible.

In some embodiments, the holder or retainer is made of or features stainless steel, in particular 316L stainless steel, and/or a plastic, in particular hard polyethylene, HDPE, and/or a metal-coated plastic. Advantageously, the material of the holder may have a lower DK value than the dielectric waveguide. Advantageously, this means that less signal is coupled out at the mountings and the signal attenuation is not significantly worsened. This may also contribute to a low susceptibility to interference of the waveguide arrangement.

In some embodiments, the holder is connected to the dielectric waveguide by means of a form-fit, force-fit, and/or material-fit connection. In this regard, the holder may be releasably connected to the dielectric waveguide.

In some embodiments, the mount is constructed from a first partial mount and a second partial mount. In this case, the second partial holder has a design corresponding to the first partial holder. Advantageously, this allows an exact fit of the partial holders to be achieved.

In some embodiments, the first and/or the second partial holder has a receptacle for the dielectric waveguide. This may, for example, be implemented in such a way that only the first partial holder has a receptacle, or only the second partial holder has a receptacle, or the receptacle is distributed between the partial holders. This may allow a centering of the dielectric waveguide in the first partial holder. This may be particularly advantageous if the second partial holder has a design corresponding to the first partial holder, so that the centering of the dielectric waveguide and the precise fit of the partial holders enable precise guidance of the waveguide.

In some embodiments, the mount and the dielectric waveguide are arranged in a housing. This may result in mechanical protection of the waveguide, for example against mechanical damage from a lateral impact, and/or against pressure, for example from a process into which an antenna system connected to the waveguide may extend.

In some embodiments, the housing is made of plastic, in particular PEEK, or metal, in particular aluminum, brass, or stainless steel. These materials may in particular support the mechanical protection of the waveguide, e.g., against impact and/or pressure, which may for example originate from a process.

In some embodiments, the housing is constructed from a first half shell and a second half shell. Advantageously, this may significantly facilitate both the fabrication of the housing and an arrangement of the waveguide within the housing.

An aspect relates to a use of a dielectric waveguide as described above and/or below or a dielectric waveguide arrangement as described above and/or below for propagating radar waves, in particular for frequencies between 70 GHz and 500 GHz, for example between 100 GHz and 300 GHz.

An aspect relates to a use of a dielectric waveguide as described above and/or below or a dielectric waveguide assembly as described above and/or below for level measurement, topology determination, and/or level limit determination.

It should also be noted that the various embodiments described above and/or below may be combined.

For further clarification, the embodiments of the present disclosure are described with reference to embodiments illustrated in the figures. These embodiments are to be understood only as examples and not as limitations.

DETAILED DESCRIPTION OF EMBODIMENTS

Figure 1:
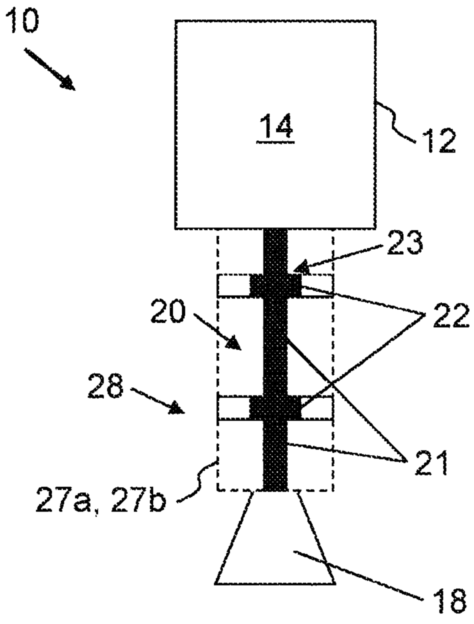
FIG. 1 schematically shows a radar device according to an embodiment.

FIG. 1 schematically shows a radar device 10, e.g., for level measurement technology in process or factory automation, according to an embodiment. The radar device 10 has sensor electronics 14 arranged in a housing 12. The sensor electronics 14 may include, for example, a generator or transmitter and/or a receiver of radio frequency (RF) waves. A connection between the sensor electronics 14 and an antenna system 18, for transmitting the RF waves, may be implemented, for example, by means of a dielectric waveguide 20. This may be particularly advantageous for applications of high process temperatures, where a certain spatial distance between the sensor electronics 14 and the antenna system 18 may be required, for example, so that the electronic components of the sensor electronics 14 may be operated within their specified temperature range. The dielectric waveguide 20 may be supported by means of one or more holders 25 (shown, e.g., in FIGS. 3*b* and 3*c*). The holder 25 (also called a support 25) may at least partially comprise the dielectric waveguide 20. The holder 25 may be connected to the dielectric waveguide 20 by means of a form-fit, force-fit, and/or material-fit connection. The holder 25 may be releasably connected to the dielectric waveguide 20. The dielectric waveguide 20 may form a dielectric waveguide assembly 28 (shown, e.g., in FIGS. 3*b* and 3*c*) with the holder 25 and, optionally, with other components—for example, a housing 27. The waveguide arrangement 28 may have a length between 1 cm and 50 cm, for example. Advantageously, such a dielectric waveguide arrangement 28 may have a low signal attenuation compared to a waveguide, e.g., at frequencies>100 GHz. Furthermore, a dielectric waveguide arrangement 28 may be manufactured relatively easily and inexpensively, e.g., as a plastic injection molded part. The manufacture of waveguides, on the other hand, may be technically demanding, complex and correspondingly cost-intensive for frequencies>100 GHz.

The dielectric waveguide 20 may have one or more first sections 21 having a substantially uniform cross-section. Further, the dielectric waveguide 20 may have one or more second sections 22. The one or more second sections 22 have a larger cross-section (or flare) than the first section 21. A transition 23 is arranged between the first section 21 and the second section 22, which transition 23 may be, for example, step-shaped, sloped and/or rounded. The one or more holders 25 are preferably arranged at the second section 22. This may be advantageous because an optimized electric field distribution in and/or on the dielectric waveguide 20 may thus be achieved. In particular, interfering reflections in the RF signal may be reduced during a transmission of the RF waves by means of the dielectric waveguide 20. Advantageously, a compromise may thus be achieved between low signal attenuation, which characterizes the first section or sections 21 in particular, and low susceptibility to interference, which is typical of the second section 22.

Figures 2A, 2B, 2C:
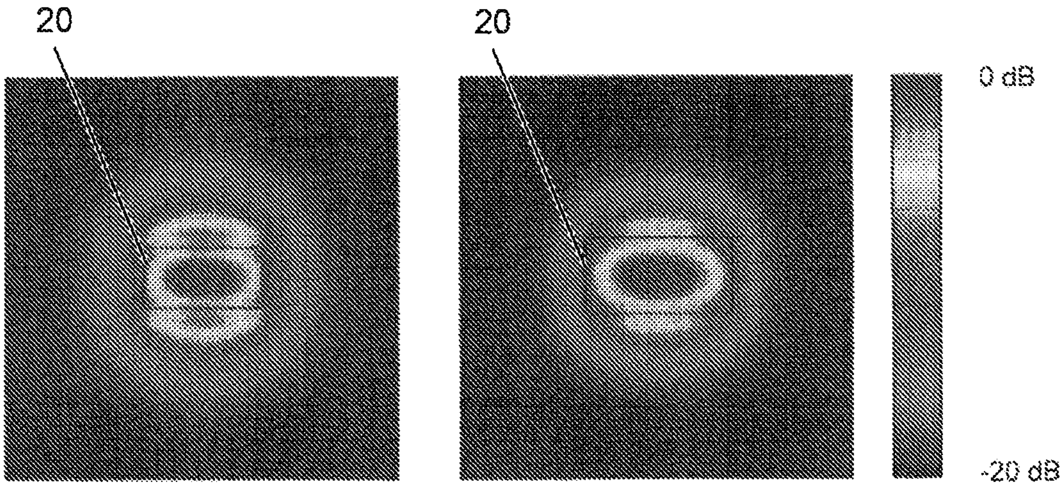
FIG. 2*a*-2*e* show a relationship between conductor cross-sections of a waveguide and an electric field distribution.

FIGS. 2*a* and 2*b* show a relationship between conductor cross sections of a waveguide 20 (see, e.g., FIG. 1) and an electric field distribution in and on the waveguide 20. The scale of FIG. 2*c* represents an attenuation of the electric field strength. The brighter, the lower the attenuation. The waveguides 20 of FIGS. 2*a* and 2*b* have a rectangular cross-section (shown in black), without any restriction of generality. The waveguide 20 of FIG. 2*b* has a larger cross-section than the waveguide 20 of FIG. 2*a*.

In the illustration of FIG. 2*a*, it is clear that the waveguide 20 has an (elliptical) maximum of the electric field strength (shown in light, corresponding to the scale of FIG. 2*c*) within the waveguide 20. Furthermore, a maximum of the electric field strength may be observed above and below the waveguide 20, i.e., outside the waveguide 20. This means that the waveguide 20 may release electrical energy to the environment when one of the regions of high field strength (e.g., above and below the waveguide 20) is touched with an object or comes close to the waveguide 20. Such an object may be, for example, a mount of the waveguide 20. The dissipation of electrical energy to the environment may, for example, result in increased attenuation and/or spurious reflections in the RF signal. However, as long as no object touches or comes close to the waveguide 20, a waveguide 20 with a small cross-section has a lower signal attenuation than a waveguide 20 with a larger cross-section (as shown, for example, in FIG. 2*b*). This is particularly true at higher frequencies, e.g., above 70 GHz or above 100 GHz.

The illustration of FIG. 2*a* shows that with a larger cross-section of a waveguide 20, smaller regions of high field strength occur outside the waveguide 20. Therefore, interference from an external object is lower than for a waveguide 20 with a smaller cross-section. However, signal attenuation is higher than for a waveguide 20 with a smaller cross-section (as shown, for example, in FIG. 2*a*).

It is thus particularly advantageous to provide a waveguide 20 having longer sections with a relatively smaller cross-section (first sections 21), for transmission with low signal attenuation, and dedicated sections with a relatively larger cross-section (second sections 22), particularly suitable for having fixtures placed thereon, for example, with relatively lower signal interference from these objects. Thus, advantageously, a compromise may be achieved between low signal attenuation, which characterizes in particular the first section(s) 21, and low interference sensitivity, which is typical for the second section 22. The further figures show realization examples for such a waveguide 20 and/or a waveguide arrangement 28.

Figure 2D:
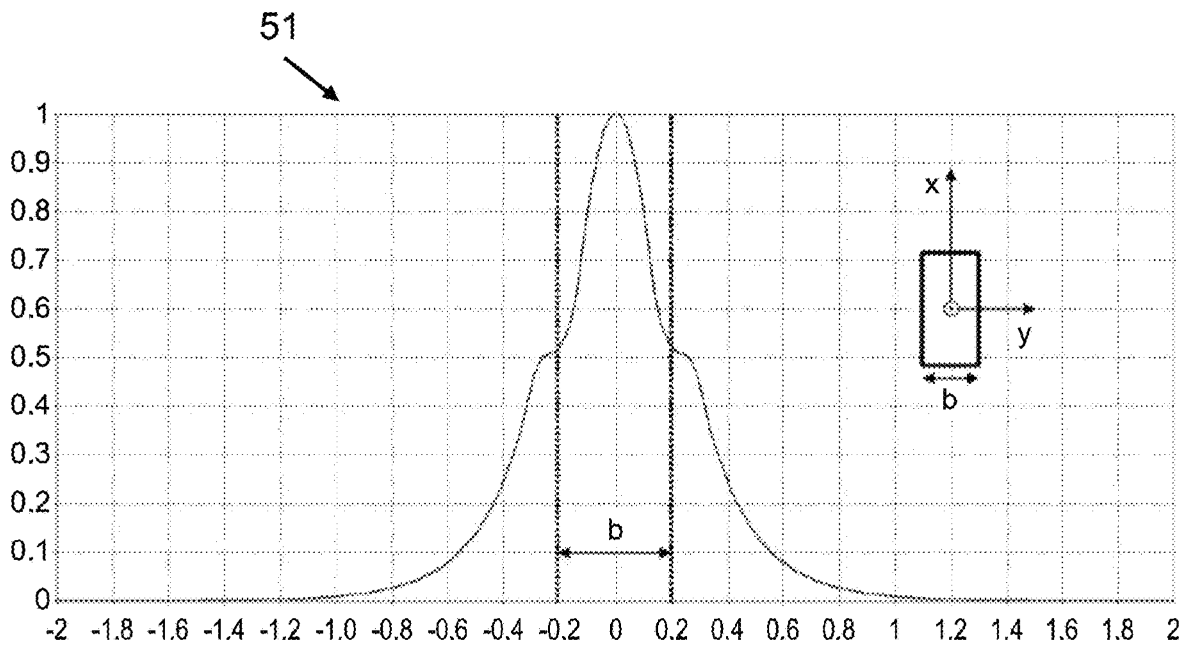
Figure 2E:
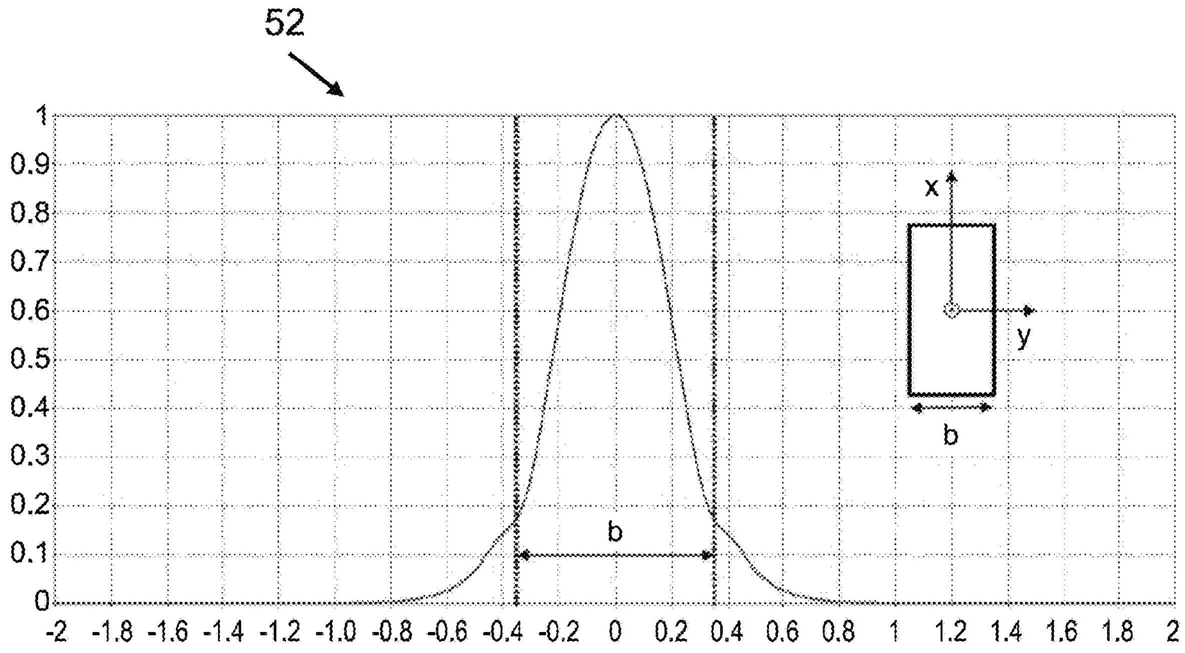

The examples of FIGS. 2*d* and 2*e* show a relationship between conductor cross-sections of a waveguide 20 (see, for example, FIG. 1) and the electric field intensity along the center of the waveguide in the horizontal direction in another representation. Here, a distance from a center of the waveguide 20 in the −y-direction is plotted on the abscissa of the diagrams 51 and 52, and a relative intensity of the electric field strength along the center of the waveguide is plotted on the ordinate. In this case, the waveguide has a width (or cross-section) b. The areas between the dashed lines thereby describe the electric field intensity within the waveguide 20. It is also clear from this illustration that the electric field intensity outside the dielectric waveguide with a smaller cross-section b (see FIG. 2*d*) is significantly higher than for a waveguide with a larger cross-section b (see FIG. 2*e*). This means—as explained above—that the waveguide 20 may emit electrical energy to the surroundings if one of the areas of high field strength (e.g., left and right of the waveguide 20) is touched with an object or comes close to the waveguide 20.

Figure 3A:
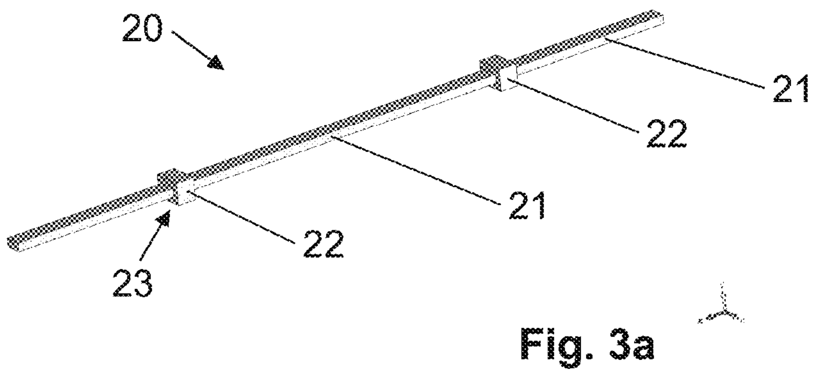
FIGS. 3*a*-3*c* schematically show a waveguide and a waveguide arrangement according to an embodiment.
Figure 3B:
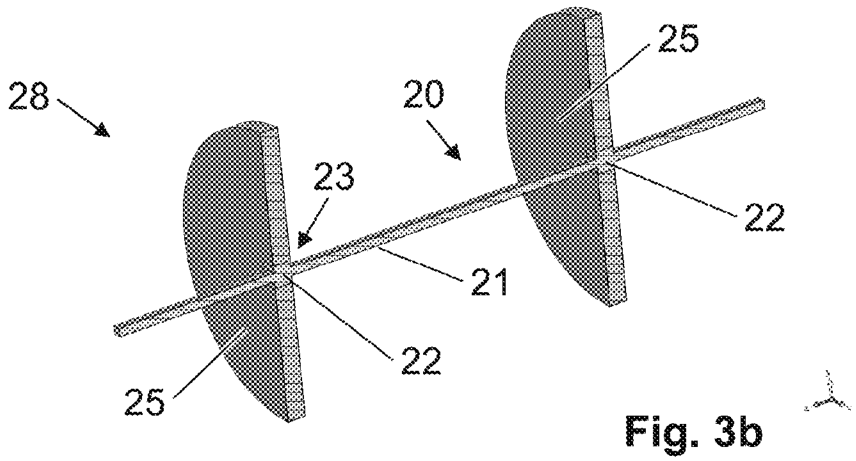
Figure 3C:
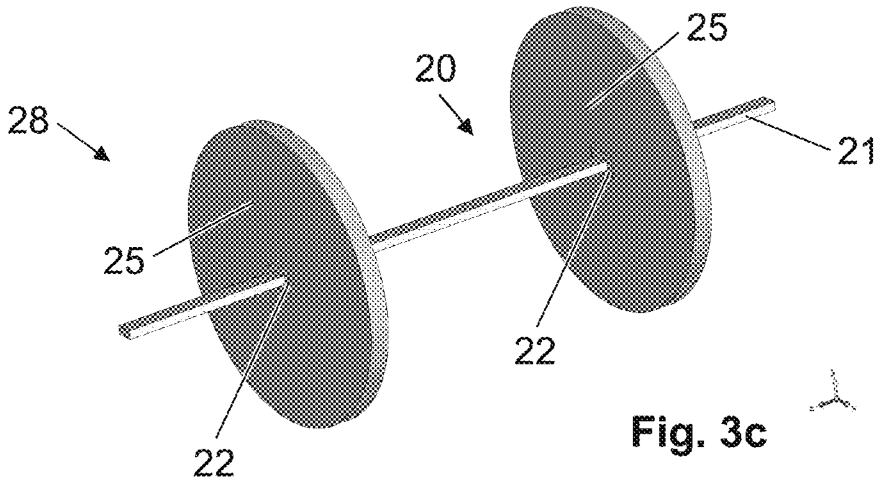

FIGS. 3*a*-3*c* schematically show a waveguide 20 and a waveguide arrangement 28 according to an embodiment. The waveguide 20 of FIG. 3*a* has a plurality of first sections 21 and two flares or second sections 22. The second sections 22 have a step-shaped transition 23 on both sides. In this regard, only the pure dielectric waveguide 20 with two cross-sectional expansions 22 is shown in FIG. 3*a*. These flares or second sections 22 may be positioned at a certain distance from each other. The longer the waveguide, the more expansions 22 may be provided.

FIG. 3*b* shows a cross-sectional view of a waveguide assembly 28 comprising a waveguide 20, such as shown in FIG. 3*a*. The waveguide 20 may be made of, for example, rigid polyethylene (e.g., HDPE). Same reference signs here denote same or similar components as in FIG. 3*a*. Furthermore, the waveguide arrangement 28 of FIG. 3*b* has two holders 25 arranged in the region of the second sections 22. These may be used, for example, to properly position and appropriately hold the waveguide in its housing. The holders 25 may advantageously be made, for example, of a metallic material, such as stainless steel 316L, and/or of, for example, plastics. In this regard, the material of the holder may advantageously have a lower DK value than the dielectric waveguide. This may contribute to a low susceptibility to interference of the waveguide arrangement.

In one embodiment, the mounting of the waveguide may be realized by means of (rigid) foam, e.g., ROHACELL®. This may be advantageous for applications with lower requirements for temperature resistance and/or mechanical stability.

FIG. 3*c* shows a perspective view of a waveguide arrangement 28 as in FIG. 3*b*. The waveguide assembly 28 has a waveguide 20 and mounts 25 disposed in the region of the second sections 22.

Figure 4A:
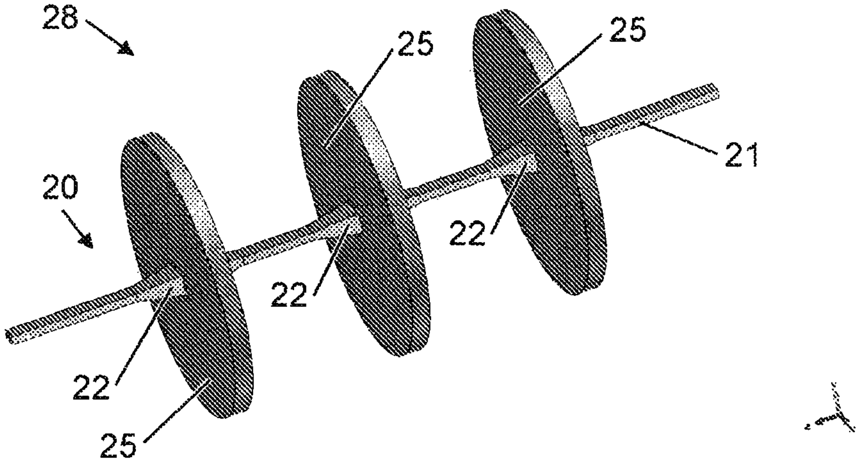
FIGS. 4*a*-4*b* schematically show a waveguide arrangement according to a further embodiment.
Figure 4B:
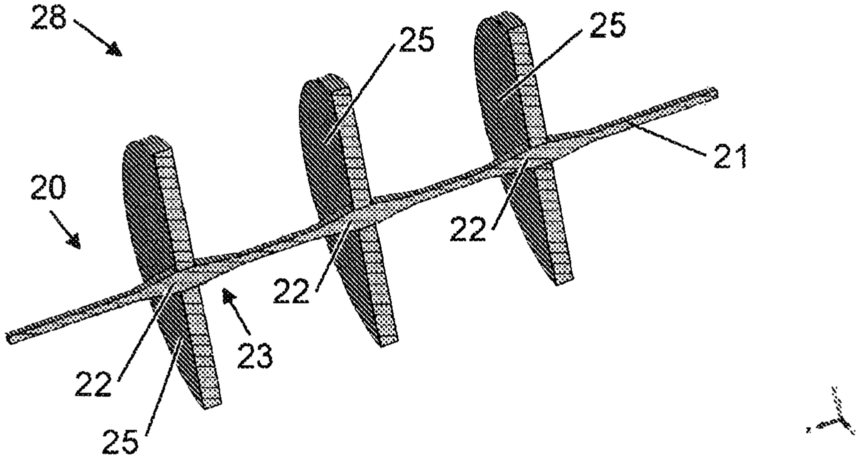

FIGS. 4*a* and 4*b* schematically show a waveguide arrangement 28 according to a further embodiment, in each case in perspective view (FIG. 4*a*) and in cross-section (FIG. 4*b*). The waveguide arrangement 28 has a waveguide 20 and three holders 25 arranged in the region of the second sections 22. The second sections 22 and the holders 25 are arranged equidistantly; however, other distances are possible. As can be seen in particular in FIG. 4*b*, the transitions 23 are designed obliquely. However, step-shaped and/or rounded designs are also possible, for example. In this example, the transitions 23 from the first sections 21 of the waveguide 20 to the expansions 22 at the holding points are implemented with suitable tapers (tapers, or a transition, e.g., an expansion, from the small conductor cross-section to the large conductor cross-section). The interference reflections or the influence of the holders may thus be advantageously reduced again.

Figure 5A:
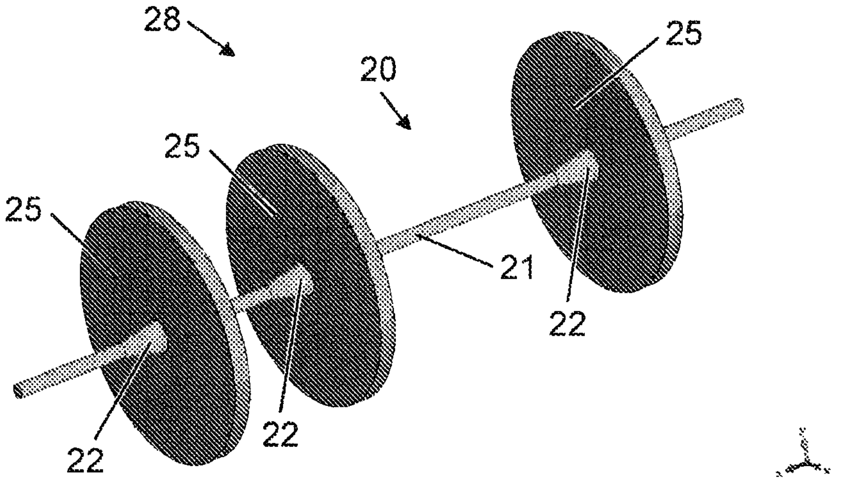
FIGS. 5*a*-5*b* schematically show a waveguide arrangement according to a further embodiment.
Figure 5B:
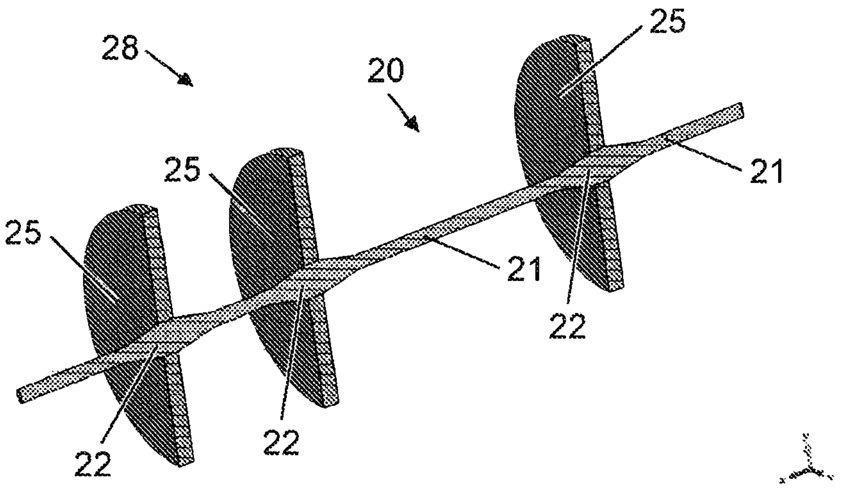

FIGS. 5*a*-5*b* schematically show a waveguide arrangement 28 according to a further embodiment, in each case in perspective view (FIG. 5*a*) and in cross-section (FIG. 5*b*). Identical reference signs denote the same or similar components as in the previous figures. The waveguide assembly 28 has a waveguide 20 and three holders 25 disposed in the region of the second sections 22. The second sections 22 and the holders 25 are not arranged equidistantly.

Figure 6A:
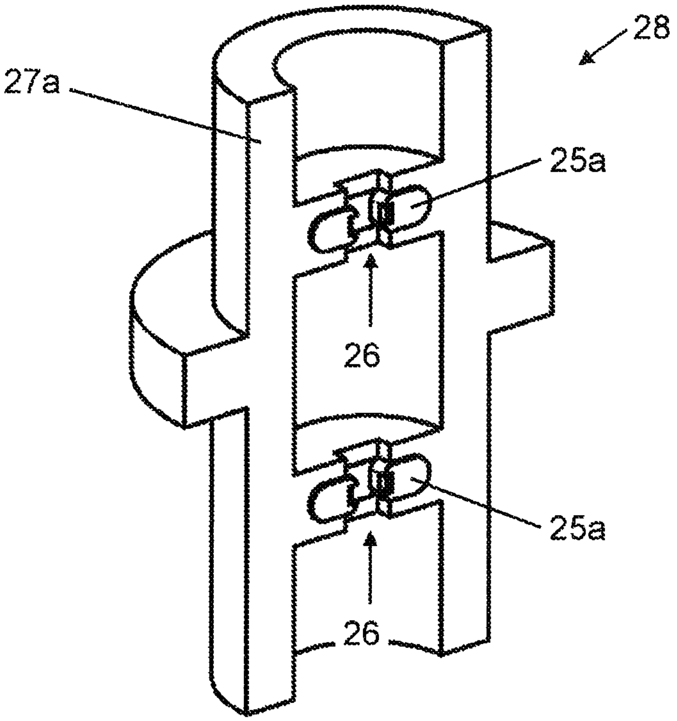
FIGS. 6*a*-6*b* schematically show a part of a waveguide arrangement according to an embodiment.
Figure 6B:
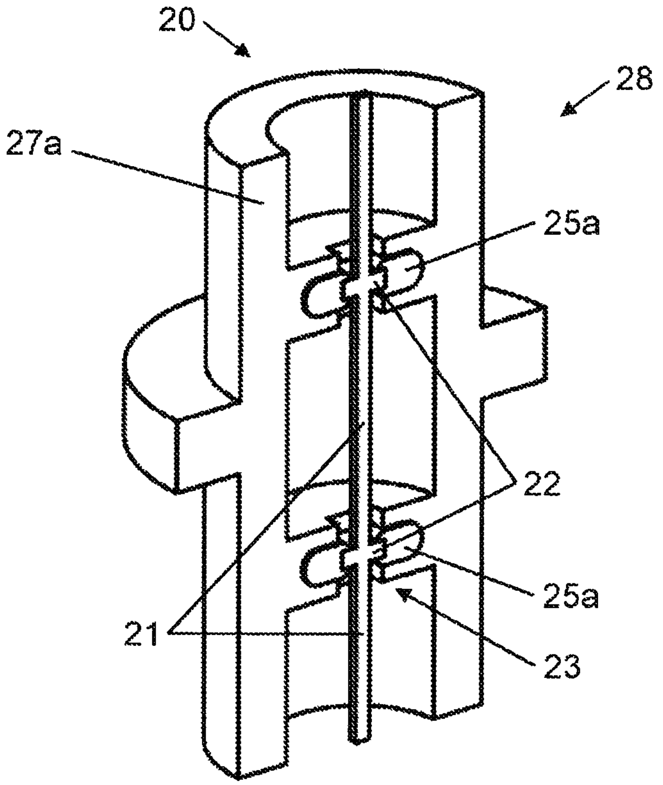

FIGS. 6*a*-6*b* schematically show a part of a waveguide arrangement 28, in particular a first partial housing 27*a*, according to one embodiment. The first partial housing 27*a* is designed as a so-called half shell 27*a*. Advantageously, the first half shell 27*a* may be designed to have a design corresponding to a second half shell 27*b* (see FIG. 7). This allows the first half-shell 27*a* and the second half-shell 27*b* to be joined together to form a housing 27 (see FIG. 8), which is adapted to receive the waveguide 20. The housing 27 (with the half-shells 27*a*, 27*b*) may, for example, be made of plastic, e.g., of PEEK, or of metal, e.g., of aluminum, brass, or stainless steel. A housing made of plastic may be advantageous if, for example, electrical or galvanic isolation from the process and/or from the process housing is required. The housing 27, 27*a*, 27*b* may be designed to be pressure bearing, in particular to be robust against a pressure from the process.

The first half shell 27*a* has a first partial holder 25*a*. It is clearly visible that the first partial holder 25*a* is designed to protrude ("project") from the first half-shell 27*a*. Advantageously, this allows a good fit ("key") with the second partial holder 25*b* ("keyway"), which is arranged recessed ("recessed") in the second half-shell 27*b* (see FIG. 7). The first and/or the second partial holder 25*a*, 25*b* may, for example, be made of metal, e.g., aluminum, brass, or stainless steel, or may comprise these materials. The first and/or the second partial holder 25*a*, 25*b* may also be made of plastic, in particular of a plastic coated with metal. It may be advantageous if the material of the holder 25 has a lower DK value than the dielectric waveguide 20.

FIG. 6*b* shows the part of a waveguide arrangement 28 of FIG. 6*a*, in particular the first partial housing 27*a*, in which a waveguide 20 is arranged. The waveguide 20 has a first section 21, having a substantially uniform cross-section, and a second section 22, having a larger cross-section than the first section 21. In the embodiment shown, a transition 23 between the first section 21 and the second section 22 is step-shaped. The transition 23 may also be formed in an inclined and/or rounded manner. It can be seen that the first partial support 25*a*—in particular supported by its protruding design—is designed to be particularly suitable for receiving 26 the second section 22 of the waveguide. In the case of a different design of the second section 22, for example oblique and/or rounded, the first partial holder 25*a* may be designed accordingly. By the shown combination of protruding first partial holder 25*a* and the integrated receptacle 26, the waveguide 20 can be centered in the housing 27*a*, 27*b*. At the same time, an alignment of the two half-shells 27*a*, 27*b* can be ensured. Advantageously, the realization of the housing as two half-shells 27*a*, 27*b* may both facilitate the manufacturing of the housing and ensure a centered arrangement of the waveguide in the housing in a simple manner.

Figure 7:
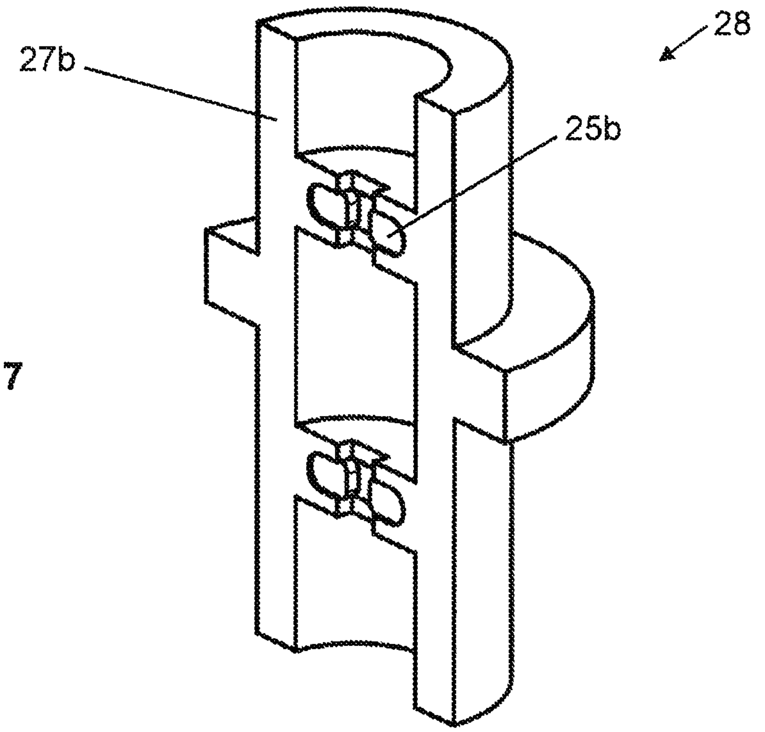
FIG. 7 shows schematically a portion of a waveguide assembly according to an embodiment.

FIG. 7 schematically shows a part of a waveguide arrangement 28, in particular a second partial housing 27*b*, according to one embodiment. The second partial housing 27*b* is designed as a half shell 27*b* and has a design corresponding to the first partial housing 25*a*.

Figure 8:
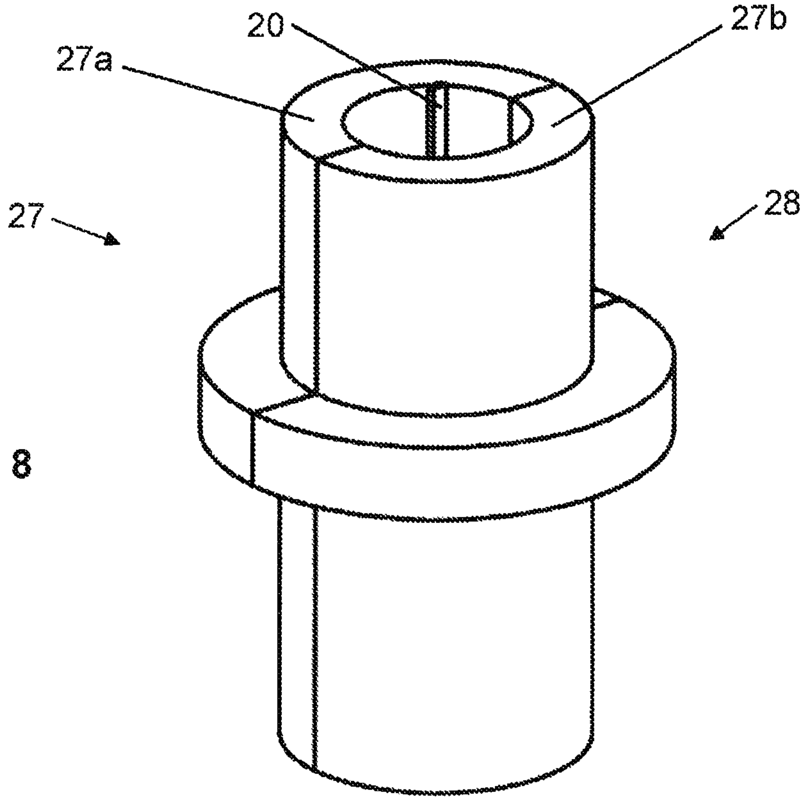
FIG. 8 shows a schematic of a waveguide arrangement according to an embodiment.

FIG. 8 schematically shows a waveguide arrangement 28 according to one embodiment. The waveguide arrangement 28 has a housing 27 realized as two half-shells 27*a*, 27*b* (see FIG. 6*a* and FIG. 7, respectively). A waveguide 20 is arranged in the housing 27, for example in a manner as shown in FIG. 6*b*.

LIST OF REFERENCE SIGNS

10 Radar device
12 Housing
14 Sensor electronics
18 Antenna system
20 Dielectric waveguide
21 First section of the waveguide
22 Second section of the waveguide
23 Transition
25 Holder, support, retainer
25*a*, 25*b* Partial holders
26 Receptacle
27 Housing
27*a*, 27*b* Partial housing
28 Dielectric waveguide array
51, 52 Diagrams

The invention claimed is:

1. A dielectric waveguide for propagating high-frequency waves, the dielectric waveguide comprising:
- a first section having a substantially uniform cross-section; and
- a second section having a larger cross-section than the first section,
- wherein a cross-sectional area of the second section is larger than a cross-sectional area of the first section by a factor of 5 to 80, and/or
- wherein the cross-section of the first section has a cross-sectional area between 0.25 $mm^2$ and 8 $mm^2$.

2. The dielectric waveguide according to claim 1,
- wherein the dielectric waveguide has a plurality of second sections, and
- wherein the second sections have a spacing between each of the second sections of between 10 mm and 300 mm.

3. The dielectric waveguide according to claim 1,
- wherein the dielectric waveguide has a DK value between 2 and 5.

4. The dielectric waveguide according to claim 1,
- wherein a transition between the first section and the second section is stepped, sloped, or rounded.

5. The dielectric waveguide according to claim 1, the dielectric waveguide being configured for propagating radar waves for frequencies between 70 GHz and 500 GHz.

6. The dielectric waveguide according to claim 1,
- the cross-section of the first section or of the second section is elliptical, round, rectangular, square, or polygonal.

7. A radar device, comprising a dielectric waveguide according to claim 1, or a dielectric waveguide arrangement comprising the dielectric waveguide and a holder that at least partially surrounds the dielectric waveguide.

8. The radar device according to claim 7, the radar device being configured for level measurement, for topology determination, or for level limit determination.

9. A dielectric waveguide assembly, comprising:

a dielectric waveguide according to claim 1; and a holder that at least partially surrounds the dielectric waveguide.

10. The dielectric waveguide according to claim 9, wherein the holder is detachably connected to the dielectric waveguide.

11. The dielectric waveguide according to claim 9, wherein the housing is made of plastic or of metal.

12. The dielectric waveguide assembly according to claim 9, wherein the holder is made of stainless steel, or of aluminum, or of a metallic-coated plastic, of a foam, or comprises the stainless steel or the aluminum or the metallic-coated plastic or the foam, and wherein a material of the holder has a lower relative permittivity (DK) value than a relative permittivity (DK) of the dielectric waveguide.

13. The dielectric waveguide according to claim 9, wherein the holder is composed of a first partial holder and a second partial holder having a design corresponding to the first partial holder, and wherein the first partial holder or the second partial holder has a receptacle configured for the dielectric waveguide.

14. The dielectric waveguide assembly according to claim 9, wherein the holder is connected to the dielectric waveguide by means of a form-fit or a force-fit connection.

15. The dielectric waveguide according to claim 9, wherein the housing is constructed from a first half shell and a second half shell.

16. The dielectric waveguide assembly according to claim 9, wherein the holder and the dielectric waveguide are arranged in a housing.

* * * * *